No. 622,728. Patented Apr. 11, 1899.
J. A. STOUP.
NUT LOCK.
(Application filed June 18, 1898.)
(No Model.)
Fig.1.
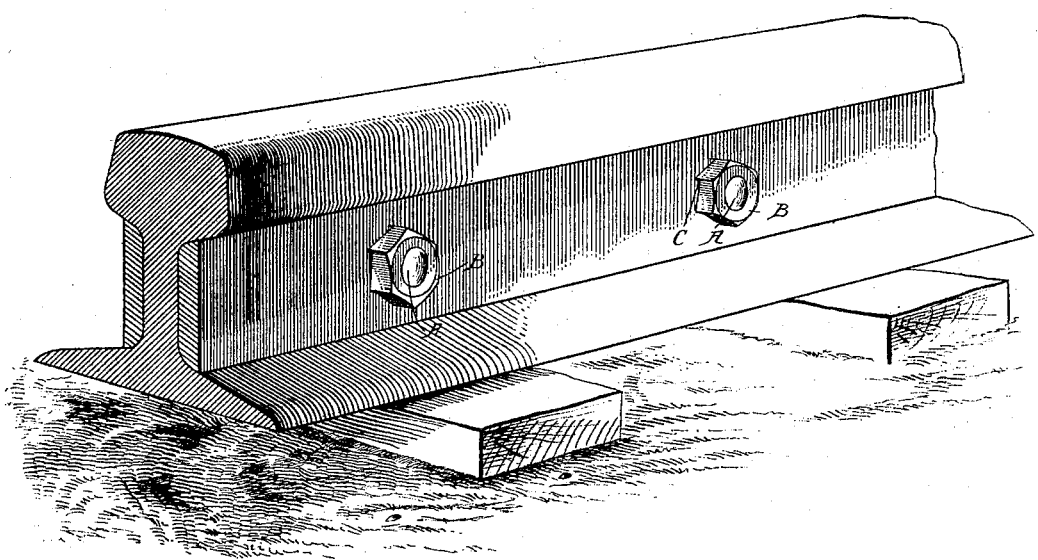
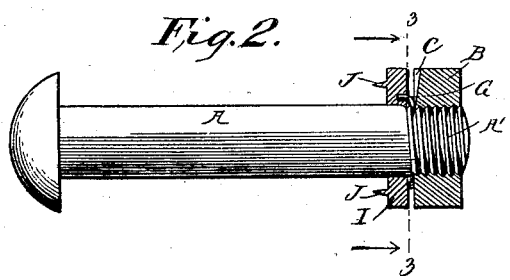
Fig.2.
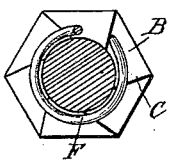
Fig.3.
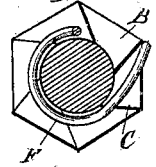
Fig.4.
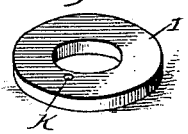
Fig.5.
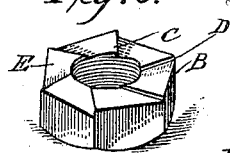
Fig.6.
Fig.7.
Witnesses
T. P. Britt
Chas. E. Brock
Inventor
John A. Stoup
by O'Meara
Attorneys
THE NORRIS PETERS CO., PHOTO-LITHO., WASHINGTON, D. C.

UNITED STATES PATENT OFFICE.

JOHN A. STOUP, OF CRAB TREE, PENNSYLVANIA.

NUT-LOCK.

SPECIFICATION forming part of Letters Patent No. 622,728, dated April 11, 1899.

Application filed June 18, 1898. Serial No. 683,824. (No model.)

*To all whom it may concern:*

Be it known that I, JOHN A. STOUP, a citizen of the United States, residing at Crab Tree, in the county of Westmoreland and State of Pennsylvania, have invented a new and useful Nut-Lock, of which the following is a specification.

This invention relates to improvements in nut-locks especially adapted for railroad-rails, although applicable for use wherever bolts and nuts are employed.

The object of the invention is to provide a device of this class whereby the nut will be locked upon the bolt against the possibility of working loose when exposed to jarring action or concussion, but so constructed that the nut may be turned off by the exertion of a little extra pressure on the wrench.

With this object in view my invention consists in the improved construction, arrangement, and combination of parts hereinafter fully described, and afterward particularly pointed out in the claims.

In order to enable others skilled in the art to which my invention most nearly appertains to make and use the same, I will now proceed to describe its construction and operation, having reference to the accompanying drawings, forming part hereof, in which—

Figure 1 is a perspective view of a nut-lock constructed in accordance with my invention applied to a railway-rail. Fig. 2 is a detail view illustrating the bolt in elevation, with the nut and washer in section, the locking-spring being shown partly in section and partly in elevation. Fig. 3 is a transverse sectional view on the line 3 3 of Fig. 2, looking in the direction of the arrow, the parts being shown in their locked position. Fig. 4 is a similar view, the parts being shown with a nut partly turned off. Fig. 5 is a detail perspective view of the washer. Fig. 6 is a similar view of the nut. Fig. 7 is a similar view of the locking-spring.

Like letters of reference indicate the same parts in all the figures of the drawings.

Referring to the drawings by letters, A indicates a bolt, of any usual or well-known construction, having a threaded end A'.

B indicates a nut which is of the usual construction except that it is provided on its inner face with a series of teeth C, extending entirely around the nut, each tooth having a front face D, substantially at right angles to the inclined plane E, which leads to the next adjacent tooth. The front face of each tooth is arranged in a line which inclines away from a diametrical or radial line drawn from its outer end, as most clearly shown in Figs. 3, 4, and 6.

F indicates the locking-spring, which consists of an open ring of spring-wire having one end G turned inward at right angles to the plane of the ring and the other end H outwardly inclined from said plane.

I indicates a washer, adapted to be placed upon the bolt, provided with inwardly-pointing lugs J on its inner face and a recess K in its outer face.

The construction of my invention will be readily understood from the foregoing, and its operation may be described as follows: When using my improved nut-lock upon wood, the bolt is passed through the parts to be secured together, and the locking-spring is then placed upon the bolt with its right-angled end G inside. The nut is then screwed upon the threaded end A' of the bolt, which will force the end G of the locking-spring into the wood and squeeze the inclined outer point H between the wood and the nut B, said end H slipping over the inclined planes E and dropping behind each tooth D as turned up tight. Any attempt to turn it backward will cause the point H to contact with the front of one of the teeth D, which will prevent the nut from jarring off or working loose. When the nut-lock is to be used with metal, the washer I will be slipped upon the bolt in advance of the locking-spring, its points or lugs J entering previously-prepared recesses in the metal and preventing the washer from turning. The locking-spring will be next placed in position with its right-angled inner end G in the recess K in the washer. The same results will be obtained in screwing up the nut as hereinbefore described with reference to the use of the nut-lock on wood.

While the strength of the spring will be sufficient to hold the nut against jarring loose, still when it is desired to take the nut off it will only be necessary to turn the nut backward with the wrench the same as though no locking-spring were used. In turning the nut backward the contact of the inclined end H of the locking-spring with the front of the tooth D with which it may be engaged will be at an outward inclination, and the forcible turning off of the lock will cause the end H of the locking-spring to be slid outward along the face of the tooth, as shown in Fig. 4, until it finally projects beyond the perimeter of the lock and affords no further obstacle to turning it off. The lock-spring being elastic will resume its original shape when released and will be ready to be used over as often as necessary.

From the foregoing it will be seen that I have provided efficient means for carrying out the object of my invention, and while I have illustrated and described the best means now known to me for carrying out my invention, I do not wish to be understood as restricting myself to the exact details of construction shown, but hold that any slight variation therefrom, such as might suggest itself to the ordinary mechanic, would clearly be comprehended in the limit and scope of my invention.

Having thus described my invention, what I claim as new, and desire to secure by Letters Patent of the United States, is—

1. The combination with a bolt having the usual threaded end, of a locking-spring adapted to be slipped over the bolt and provided with a right-angled inner end and outwardly-inclined outer end, the right-angled inner end being adapted to be seated in the material being bolted together, and a nut provided with a series of teeth on its inner face, the front faces of said teeth being inclined at an angle to a diametrical line drawn from their outer corners, substantially as described.

2. The combination with a bolt, of a washer provided with pointed lugs on its inner face and a recess on its outer face, a locking-spring in the form of a ring adapted to slip over the bolt provided with a right-angled inner end to engage in the recess of the washer and an outwardly-inclined outer end, and a nut provided with teeth on its inner face, the front edges or faces of which are inclined away from a diametrical line starting at their outer corners, substantially as described.

JOHN A. STOUP.

Witnesses:
GEO. S. NOEL,
JNO. C. FOWLER.